United States Patent [19]

Buckley

[11] Patent Number: 4,566,715
[45] Date of Patent: Jan. 28, 1986

[54] FIFTH WHEEL

[75] Inventor: John T. Buckley, Holland, Mich.

[73] Assignee: Holland Hitch Company, Holland, Mich.

[21] Appl. No.: 525,439

[22] Filed: Aug. 22, 1983

[51] Int. Cl.⁴ ............................................. B62D 53/12
[52] U.S. Cl. ..................................................... 280/434
[58] Field of Search ............... 280/433, 434, 435, 436, 280/437, 438 R, 438 A

[56] References Cited

U.S. PATENT DOCUMENTS

| | | | |
|---|---|---|---|
| 2,663,575 | 12/1953 | Ketal | 280/435 |
| 2,982,566 | 5/1961 | Geerds | 280/435 |
| 3,002,767 | 10/1961 | Gresko | 280/434 |
| 3,079,175 | 2/1963 | Walther | 280/434 |
| 3,924,909 | 12/1975 | Kent et al. | 280/433 X |
| 4,447,070 | 5/1984 | Inoue | 280/434 |

*Primary Examiner*—Joseph F. Peters, Jr.
*Assistant Examiner*—Charles R. Watts
*Attorney, Agent, or Firm*—Price, Heneveld, Huizenga & Cooper

[57] ABSTRACT

Disclosed herein is a fifth wheel hitch having a set of jaws removably retained in a pocket on the underside of the bearing plate, replaceable by like jaws or jaws accommodating a different size kingpin. The hitch can be of forged aluminum, for on-highway or off-highway usage. A swinging jaw is pivotally connected to a fixed jaw, and has a lower closure finger contacted by the head of a properly elevated kingpin to close the jaws. The jaws are locked closed by a locking plunger actuated with full jaw closure, by means of a trigger release mechanism. The trigger and plunger are retracted by a slide cam having actuators extending from both sides of the hitch. Adjustment of the jaws for wear is from the hitch exterior, and effectual whether the hitch is coupled or uncoupled.

9 Claims, 8 Drawing Figures

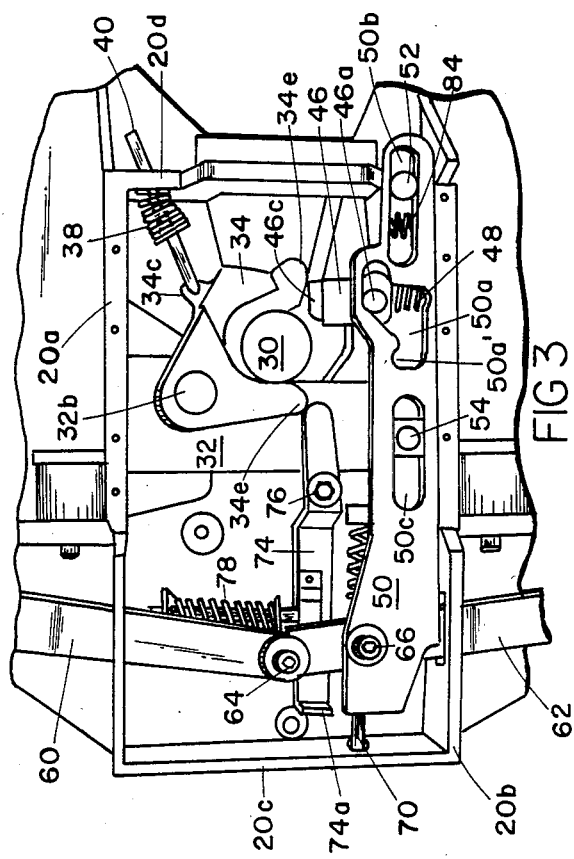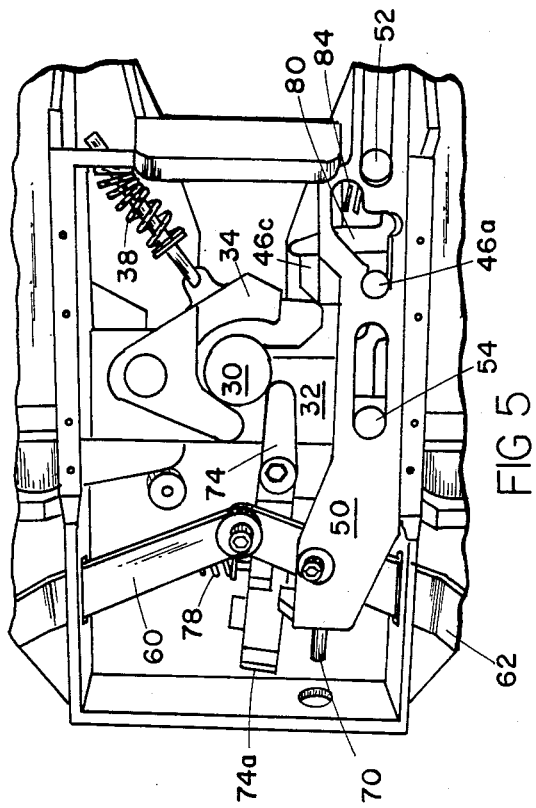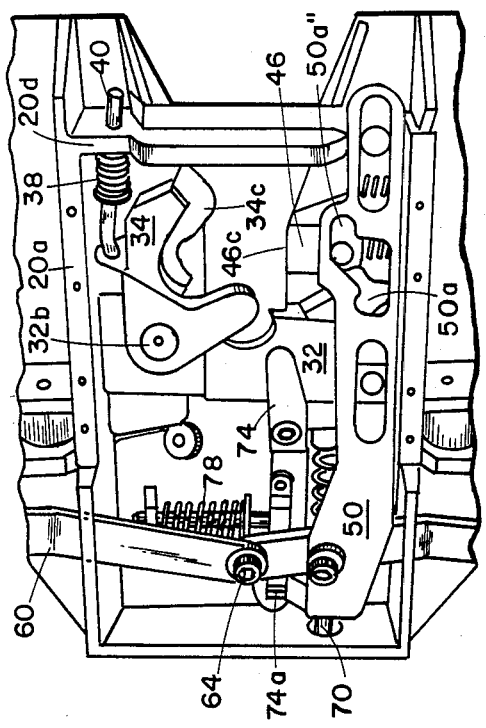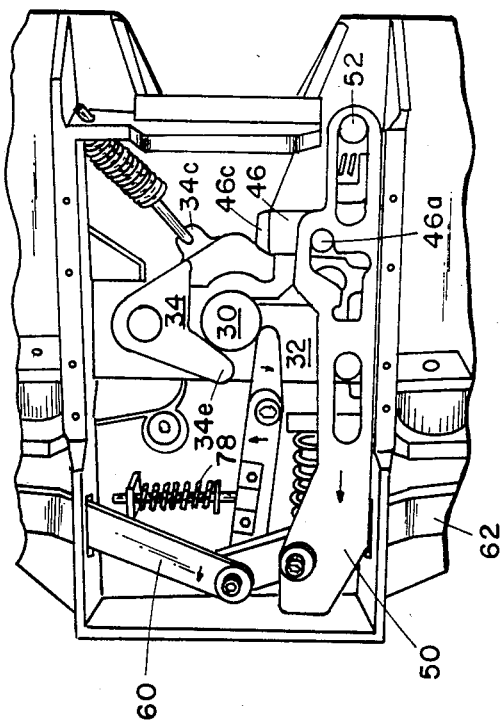

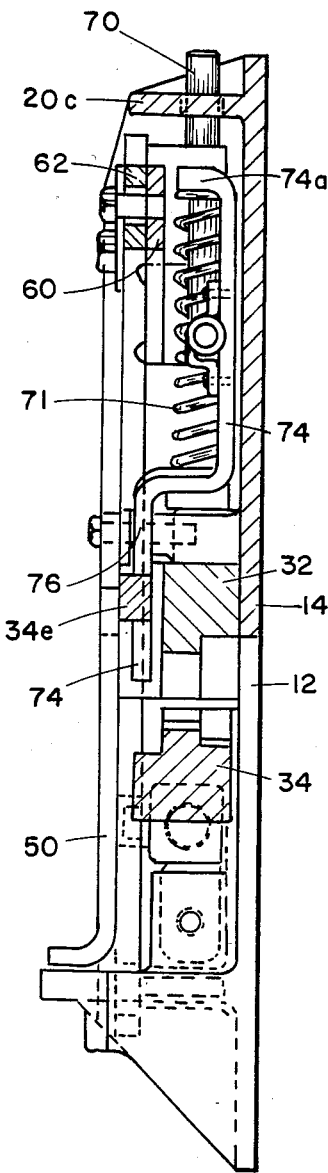

FIFTH WHEEL

BACKGROUND OF THE INVENTION

This invention relates to a fifth wheel hitch for connection to a kingpin on a truck trailer, and useful on a truck tractor for highway use, or alternatively on stanchions of flatbed railroad cars for off-highway use, i.e. so-called piggyback rail transport.

The basic fifth wheel hitch having an upper bearing plate and a throat to receive a conventional depending kingpin on a trailer is well known. Such a hitch typically employs a set of jaws attached to and forming part of the hitch to receive and connect to a predetermined size kingpin. Most kingpins in the United States are so-called two inch kingpins, having a particular enlarged diameter of about two and thirteen-sixteenths inches at the lower head thereof, and another smaller diameter, namely two inches, at the narrower throat above the head to fit into the cooperatively sized jaws, and typically a body of two and seven-eighths diameter above the throat.

However, not all kingpins are of the two inch size. Some are of three and one-half inch size. In Australia moreover, some three inch kingpins are employed. But fifth wheel hitches are normally manufactured to accommodate only one size kingpin. And, although it is understood that in Europe there has been a hitch which can be converted somehow to accommodate different size kingpins, it is not believed that a fifth wheel hitch which will easily and readily allow substitution of one type of jaw for another has been made heretofore. The capacity to enable quick, easy conversion of the fifth wheel hitch jaws to accommodate different size kingpins, or to allow rapid replacement of worn jaws, would be a significant advantage.

Fifth wheel hitches used on flatbed railroad cars as for piggyback transport of truck trailers normally are mounted on top of a vertically collapsible stanchion. Because fifth wheels are particularly heavy, the elevation and lowering of this weight can present a practical problem. Efforts have been made heretofore to form a fifth wheel of aluminum, namely by casting the fifth wheel plate of aluminum, to achieve lightweight construction. However, the cast aluminum was not of sufficient strength to withstand the stresses normally encountered. Thus, fifth wheel hitches are still of heavy steel construction. Not only is this weight a drawback on collapsible railroad flatbed stanchions, but it also adds considerably to the weight of a conventional truck tractor. Moreover, projected plans for future railroad transport of trailers include use of lightweight flatbed cars weighing only a fraction of today's conventional flatbed cars, to effect less expensive construction and also lighter, more sophisticated wheel bearings. Lowering the weight of the hitches would be desirable to accommodate these lightweight flatbeds.

Conventional fifth wheel hitches include a manual lever or actuator for releasing the kingpin when it is desired to disconnect the trailer. This lever normally projects from one side or the other of the fifth wheel hitch. Hitches employed on railroad flatcars preferably should be releasable by a workman walking along one side or the other of the truck trailers, moving from car to car, thereby enabling a crane to lift the trailers off the railroad cars. For safety reasons, it is inadvisable for the workman to have to move from one side of the railroad cars to the other for this operation. Thus, it would be desirable to have a fifth wheel hitch which would be released from both sides, so that, no matter which side of the flatbeds the worker is walking, he can remain on that side.

Whether the fifth wheel hitch is employed for on-highway or off-highway usage, wear of the jaws renders periodic adjustment advisable to minimize sloppiness of the kingpin in the jaws when connected and under motion. Prior fifth wheel hitches such as those disclosed in U.S. Pat. Nos. 2,663,575 to Ketel and 2,982,566 to Geerds have employed wear adjustment devices, but adjustment has to be made at the inside of the throat of the hitch. Further, such adjustment can only be made when the fifth wheel is detached from the trailer and kingpin. Even then it is cumbersome to do because of minimal space for one's hands at that location, and the presence of grease and dirt. Thus, it would be desirable to have a fifth wheel hitch wherein the adjustment for jaw wear could be made even if the hitch is connected to a kingpin, and from the exterior of the hitch.

In the conventional fifth wheel hitch, the jaws are closed around the kingpin by the entering kingpin itself. It can occur that the kingpin on the trailer is slightly too high relative to the jaws so that the enlarged lower head of the kingpin, rather than the smaller diameter throat thereabove, enters and actuates the jaws to closed position. It is known to employ a lock guard that projects between the jaws and must be shifted down by the kingpin at a correct elevation (see U.S. Pat. No. 2,982,566 at 58), but it would be advantageous to have mechanism preventing a swinging jaw from locking in such a situation and to have this unlocked condition visibly indicated, so that the operator would immediately realize he must change the relative elevation between these components to achieve the effective interengagement with the jaws locking only on the throat of the kingpin.

SUMMARY OF THE INVENTION

The fifth wheel hitch herein employs a set of jaws retained in a pocket on the underside of the bearing plate, the jaws being removably simply by unfastening of a retention cover, for simple, easy replacement of worn jaws or, if desired, substitution of other jaws that will accommodate different size kingpins. The jaws are interconnected with each other for maximum intercooperation, but are not attached to the hitch plate as conventionally done. They are laterally and longitudinally retained in a pocket by special abutments protruding downwardly from the hitch wheel plate, and are vertically retained between the hitch plate and retention cover.

The fifth wheel hitch herein is useful on a truck tractor or on a flatbed railroad car. Its special construction and configuration enables it to be manufactured of forged aluminum, so as to have adequate strength yet be relatively light in weight. Such a forging includes the bearing plate and integral depending abutments which form a pocket for laterally retaining the locking jaws, and to which the releasable cover is attached. This lightweight construction is advantageous for both on-highway and off-highway use. The hitch may alternatively be constructed of other than aluminum, specifically by steel casting or steel fabrication.

The hitch has a fixed jaw and a swinging jaw, the latter including a unique closure finger at the bottom thereof, and projecting horizontally into the throat of the hitch so as to be engaged by the enlarged lower head of the entering kingpin for total closure of the jaws only when the kingpin is at the proper vertical elevation.

The fifth wheel hitch herein has a locking plunger which retains the jaws closed to prevent premature release of the kingpin, being biased toward this locked position, but unlike prior art plungers, being releasable by trigger means actuated by a properly vertically positioned entering kingpin, at the end of its entry, to allow the biasing means to shift the plunger to the locked position. The plunger is cammable to the release position by shifting a slide cam plate with an actuator extending from either or both sides of the hitch. The trigger means is also reactivated by this same slide cam plate shift.

The position of the locking plunger is adjustable from externally of the hitch, to adjust the plunger in the direction normal to its direction of shift, i.e. toward the front of the hitch, to press the shiftable jaw further toward the stationary jaw. This enables optimum fit of the jaws around the kingpin even after wear has occurred on the kingpin and/or jaws. The adjustment mechanism incorporates a wedge movable in increments transversely of the hitch to effect plunger adjustment longitudinally of the hitch.

These and other features and objects of the invention will be apparent upon studying the following specification in conjunction with the drawings.

BRIEF DESCRIPTION OF THE DRAWINGS

FIGS. 2-4 constitute fragmentary perspective sequential views of the bottom side of the hitch of this invention, with the cover removed to allow viewing of the jaws and related components; FIG. 2 showing a fifth wheel hitch in a completely disconnected condition; FIG. 3 showing the partial entry of a kingpin and partial movement of the swinging jaw; and FIG. 4 showing further entry of the kingpin into the hitch such that the swinging jaw is closed and the trigger mechanism is released to allow the cam plate and locking plunger to shift;

FIG. 5 constitutes a fragmentary perspective view of the bottom of the hitch just unlocked and ready for disengagement of the kingpin therefrom;

FIG. 6 is a partially sectioned, elevational view of the hitch, taken on plane VI—VI of FIG. 1;

FIG. 7 is a fragmentary perspective view of the underside of the fifth wheel hitch plate, with the cover, jaws, trigger and camming mechanisms removed therefrom to depict the forging itself; and FIG. 8 is an exploded perspective view of the components removed from the fifth wheel hitch in FIG. 7.

DESCRIPTION OF THE PREFERRED EMBODIMENTS

Figure 1:
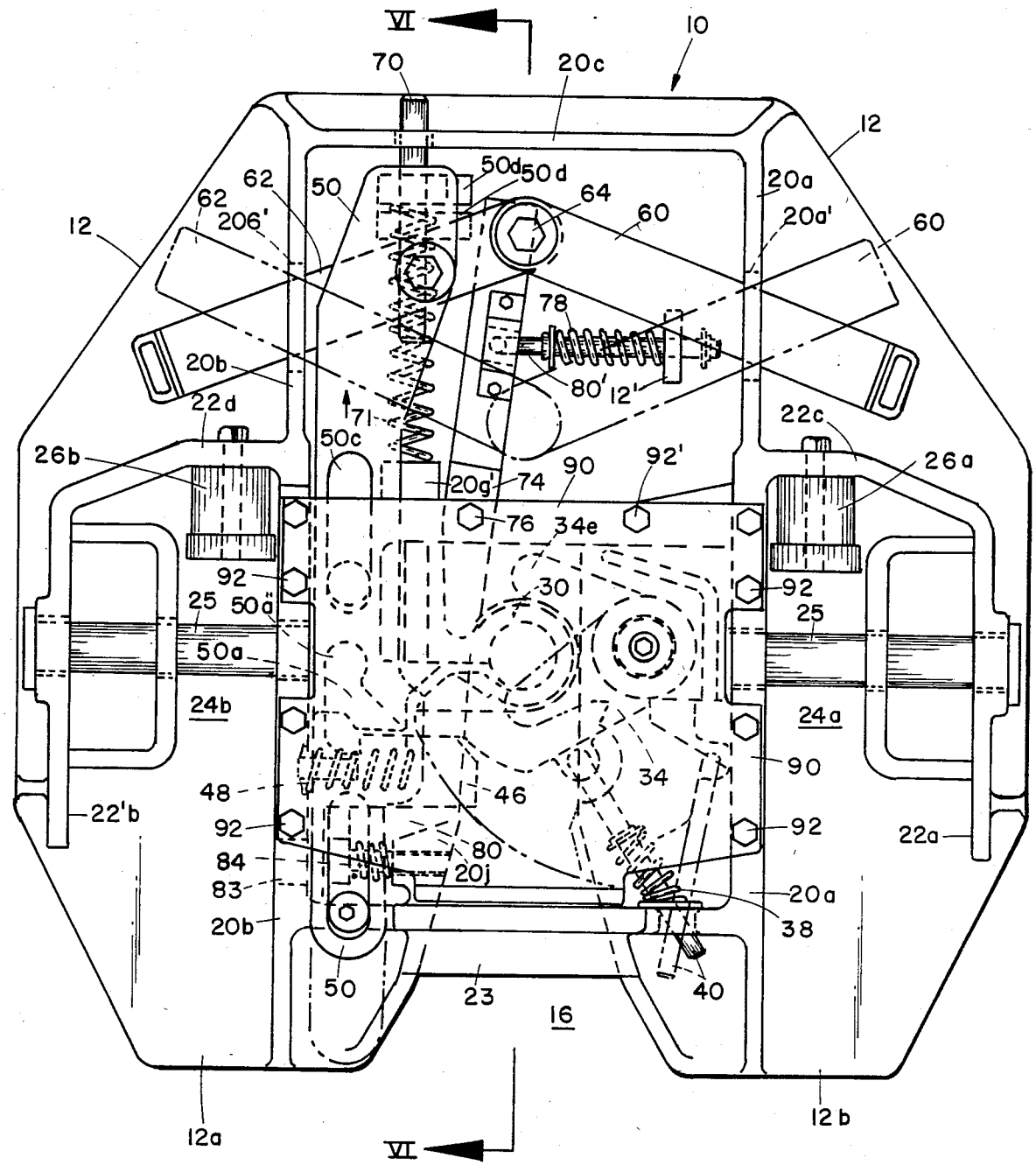
FIG. 1 is a bottom perspective view of the fifth wheel hitch of this invention.

As used herein, the terminology longitudinal of the hitch refers to the fore to aft dimension of the hitch, while the terminology transversely of the hitch refers to the side to side dimension. The terms forward and rearward, or front end and rear end, is in reference to the normal positioning of the hitch and a truck tractor or railroad car. The term horizontal encompasses the usual somewhat tilted positions of a hitch in use.

Referring now specifically to the drawings, the fifth wheel hitch 10 comprises a fifth wheel plate 12 having a flat upper bearing surface 14 (FIG. 6) and a bifurcated rear portion formed of a pair of rearwardly extending projections 12a and 12b astraddle a tapered entering mouth 16 leading to a dead-end throat 18 for receiving a cooperative kingpin moving longitudinally relative to each other. The mouth is forwardly convergent in conventional fashion.

In the preferred embodiment, the fifth wheel plate 12 is an aluminum forging. It has a generally horizontal upper portion and a series of ribs or integral abutments depending downwardly. These abutments include a pair of laterally spaced, generally parallel, depending abutment ribs or walls 20a and 20b (FIG. 7) extending longitudinally of the hitch and preferably joined at the forward ends thereof to a transverse abutment wall 20c. Also projecting transversely from wall 20a toward mouth 16 is depending abutment 20d. Projecting transversely from wall 20b toward mouth 16 is abutment 20e. Extending beneath the mouth, between abutments 20d and 20e is a transverse U-shaped reinforcing ledge 23 (FIGS. 1 and 7).

Also extending inwardly from walls 20a and 20b are transversely oriented, respective partial abutments 20f and 20g opposite each other. Abutment 20g also has a portion which extends rearwardly at 20h and then transversely inwardly, i.e. toward throat 18, at 20i, such that these three portions 20g, 20h and 20i together form a generally U-shaped inwardly facing element. Generally opposite abutment 20i is abutment 20j projecting transversely inwardly from wall 20a forward of and spaced from abutment 20f. The combination of abutments 20g, 20h, 20i, 20j, 20f and wall abutment 20a forms a generally rectangular pocket 20m to receive the locking jaws as described hereinafter. Wall abutments 20a and 20b also include fastener receiving means, preferably in the form of threaded sockets 20k and 20l respectively, at the bottom thereof, for attachment of a releasable cover and jaw support plate beneath the locking components in a manner to be described.

Spaced outwardly from and parallel to walls 20a and 20b forming an integral part of the forging, is an additional pair of ribs or walls 22a and 22b (FIG. 1), defining a pair of spaces 24a and 24b with walls 20a and 20b. Within these spaces can be included pivotal mount elements 25 shown in FIG. 1. Such allows the hitch to be used for on-highway purposes, or alternatively, to mount the hitch atop a stanchion on a flatbed railroad car for piggyback off-highway usage. The configuration depicted allows it to be used with various stanchions now available. Conventional resilient elements 26a and 26b may be located in these spaces to enable limited hitch articulation on the stanchion in known manner, being attached by bolts to transverse walls 22c and 22d extending between walls 20a and 22a, and 20b and 22b, respectively.

The hitch is adapted to connect to a conventional kingpin 30 which, as is known, is generally cylindrical in configuration, projecting downwardly from the forward end of a trailer, including an enlarged lower head, a smaller diameter throat thereabove, and another enlarged upper body portion closest to the underside of the trailer. The typical dimensional difference between the head and throat is depicted by the two concentric dotted circles shown at 30 in the hitch in FIG. 1. For example, on a conventional two-inch kingpin, the diameter of the head and body is two and thirteen-sixteenths inches and that of the throat is two inches.

The hitch is capable of locking with this kingpin 30 or disengaging therefrom with a pair of jaws 32 and 34. Specifically, stationary jaw 32 has a rearwardly facing semicircular cavity 32a (FIG. 8) and cooperates with pivotally shiftable jaw 34 having a generally semicircular shaped cooperative cavity 34a. Cavity 34a is movable into mating position with cavity 32a of jaw 32 for locking around the kingpin throat. The curvature of rearwardly facing cavity 32a and forwardly facing cavity 34a basically matches the cylindrical curvature of the kingpin throat.

Jaw 32 is shown to be generally rectangular in shape. It fits into a correspondingly shaped pocket 20m previously described. It is stationary in this position, its curved cavity 32a basically in alignment with the curved inner dead end of throat 18. Jaw 32 abuts along its lateral side edges with portions 20h and the inside surface of wall abutment 20a. Its forward walls abut the rearward surfaces of abutments 20i and 20j, and its rearward wall abuts against abutments 20f and 20g. These prevent the jaw from shifting laterally, forwardly or rearwardly.

Projecting downwardly from jaw 32, laterally offset from throat 18 is a pivot pin 32b. In pivotal jaw 34 is a cylindrical opening 34b of the same diameter as pin 32b, to fit thereover and thereby form a pivotal connection of jaw 34 on jaw 32. Pivotal jaw 34 thus can shift from an open, unlock position, depicted in FIG. 2 for example, to allow passage of a kingpin, to a fully closed lock position, depicted in FIGS. 1 and 5 for example, behind a kingpin. It is biased to one or the other of these two positions by an overcenter biasing means depicted as a coil spring 38 around a pin 40, one end of the pin being pivotally connected to an ear 34c on pivotal jaw 34. The spring 38 is compressed between a fixed washer 42 against an abutment 40a on rod 40 on one end of the spring, and the fifth wheel plate abutment 20d on the other end of the spring.

The hitch includes a transversely movable locking plunger 46 capable of shifting between a retracted, jaw release position toward abutment wall 20b as in FIGS. 2 and 3, and an extended jaw locking position to the rear of closed pivotal jaw 34 as depicted in FIGS. 4 and 1. This plunger is biased toward the extended lock position by a coil compression spring 48 trapped between a spring pocket in the outer end of the plunger and the inner face of wall 20b. It can be retained in retracted position against the force of this biasing spring by cooperative action with a slide cam plate 50. Plunger 46 has an inner nose 46c which can be engaged by a camming nose 34e (FIG. 3) of jaw 34 when this jaw is moving therepast. Plunger 46 includes a cam follower 46a, preferably in the shape of a cylindrical pin projecting downwardly from the plunger and fitting into a configurated cam slot 50a in slide plate 50. This slide plate is movable only in one dimension, forwardly and rearwardly, being restrained laterally by the interfit of a air of fixed guide pins 52 and 54 projecting into fore to aft elongated slots 50b and 50c in the slide plate. Configurated cam slot 50a includes a forward end socket 50a' (FIG. 2) for receiving cam follower 46a when the slide cam plate is to its rearwardmost position, for retaining plunger 46 in retracted position against biasing spring 48. The biasing force of plunger spring 48 is greater than that of cam slide plate spring 71 (to be described) to retain plunger 46 in its retracted position at socket 50a' until the cam slide plate 50 is purposely shifted. This configurated slot 50a also includes a rearward end socket 50a" (FIG. 2), displaced laterally from the forward end socket, for retaining cam follower 46a in the plunger release position when the slide cam plate is in its forwardmost position and plunger 46 projects transversely behind the closed swinging jaw 34, biased by plunger spring 48, to lock the jaw closed. Between these two sockets is a diagonally sloped camming surface for laterally shifting the cam follower and plunger to retracted unlocked position when the slide plate is purposely shifted longitudinally rearwardly. That is, it serves as a reset camming means for the plunger. Forward shifting of the slide plate allows the cam follower to release the plunger for lateral extension thereof into its lock position.

Rearward movement of slide cam plate 50 to retract plunger 46 from its lock position to its unlock position is achieved by an actuator mechanism to be described. Forward movement of the slide cam plate to allow the plunger to be shifted from its unlock position to its lock position is achieved by the action of a biasing mechanism when released by a trigger mechanism i.e., trigger release means, to be described.

This shifting of the slide cam plate from the forward plunger release, lock position, rearwardly to the plunger retraction unlock position is achieved through use of one of two actuator levers 60 and 62 which project laterally from opposite sides of the hitch. These two levers allow this actuation from either side of the hitch. These two levers are pivotally connected to each other at their inner ends by a pivot pin 64. They extend out through orifices 20a' and 20b', respectively, (FIG. 1) in the forward portions of respective side walls 20a and 20b (FIG. 3) to pivot on the ends of these orifices. Lever 62 is pivotally attached by pin 66 to the forward portion of slide cam plate 50. Either lever can be manually forced forwardly to cause the lever to pivot on the forward end of the orifice through which it projects. Forward movement of the outer ends of either of the levers 60 or 62 from the rearward position (solid lines in FIG. 1) to the forward position (phantom lines in FIG. 1) will force pivot pin 64 connecting these links rearwardly toward throat 18, thereby also forcing pivot pin 66 and slide cam 50 rearwardly. This causes the sloped cam surface of configurated slot 50a to force cam follower 46a laterally outwardly toward wall 20b and thereby retract plunger 46 away from pivotal jaw 34. This action movement of cam plate 50 is against the bias of a compression coil spring 71 which extends between a boss 20g' on transverse abutment 20g and a flange 50d (FIG. 1) projecting from and secured to the forward end portion of slide cam 50. Flange 50d moves forwardly and rearwardly with slide cam plate 50.

Also secured to flange 50d is an indicator pin 70 shiftable between a recessed position within the confines of transverse wall 20c and thereby out of sight to an observer (e.g. FIGS. 3 and 5) and an extended position projecting through an opening in forward transverse wall 20c (FIG. 1). This indicator pin can be used to quickly indicate to the operator or other observer whether the hitch mechanism is properly locked or not. It visibly projects from the front of the wheel only when the hitch is properly locked. If desired, and as explained hereinafter this pin can alternatively be made to be visible when the hitch is not locked, so as to be out of sight only when the hitch is locked.

As mentioned previously, slide cam 50 is released by a trigger mechanism to move from its rearward position to its forward position under the bias of compression coil spring 71. The trigger mechanism includes a lever 74 pivotal intermediate its ends on pin 76 (FIG. 3), having a downwardly protruding flange 74a at the forward end thereof to engage behind flange 50d of slide cam 50, to prevent the slide cam from moving forwardly when the trigger is clocked, the trigger being biased to this position by a compression coil spring 78 around a guide rod 80'. Rod 80' has one end attached to trigger lever 74 and the other end passing through a slide flange 12' (FIG. 7) projecting downwardly from hitch plate 12. Trigger 74 includes a rearward end portion projecting chordally of the dead end of throat 18 to be engaged by the side periphery of the lower head of the kingpin at the final stage of movement of an entering kingpin as the throat of the kingpin engages jaw 32. This shifts the trigger away from throat 18 to cause the trigger to pivot about pin 76 in a clockwise direction as viewed from beneath (FIG. 1), against the bias of compression spring 78, to shift flange 74a out of engagement in front of flange 50d of slide cam 50, thereby allowing the slide cam to be shifted under the force of its biasing spring 70 to its forward position, thus releasing locking plunger 46 in the manner indicated previously. Upon being released by this trigger release means, the plunger shifts laterally under the force of its spring 48 behind jaw 34 to lock it closed. Moreover the plunger cannot be forcefully shifted from this lock position by some lateral thrust on it because its follower 46a is laterally restrained in socket 50a' under the bias of spring 48.

Pivotal jaw 34 includes a finger 34e which is located at the bottom of the jaw, and which, in the open position of the jaw, projects into the area beneath throat 18 of the fifth wheel plate, to be engaged by the enlarged lower head of an entering kingpin 30. This engagement of the head of kingpin 30 with finger 34e causes jaw 34 to be pivoted from its open position depicted in FIG. 2, through the pivotal sequence depicted in FIGS. 3 and 4 to the closed position wherein the kingpin is between the two jaws. The location of this finger at the lower portion of jaw 34 is such that, if the kingpin is elevated more than a predetermined fraction of an inch, e.g. approximately one-half inch, relative to the jaws, so as to not be vertically aligned, the kingpin head will not contact this finger and thus pivotal jaw 34 will not be shifted to its closed position. This is a safety feature to prevent the jaw from being closed upon the head of the kingpin rather than upon the throat thereof.

The nose 46c of plunger 46 projects slightly into the path of camming nose 34e of jaw 34 such that jaw 34, when pivoting toward the closed position (see FIGS. 3 and 4), momentarily pushes plunger 46 outwardly against its spring 48 until the jaw passes the plunger.

The hitch provides externally accessible plunger adjustment means for effecting close fit of the jaws on a kingpin. This is particularly useful in the event of a somewhat worn kingpin and/or somewhat worn jaws. In such event, the kingpin throat diameter will be slightly smaller and/or the jaw cavities 32a and 34a slightly larger in diameter. The rear surface 46f (the term "rear" is used relative to the hitch front and rear ends) of plunger 46 abuts the forward face 80a of a wedge element 80 (FIG. 8). The opposite face 80b of element 80 is tapered and abuts a correspondingly slanted fixed bearing surface of an integral abutment 20j of the hitch plate. Adjustment bolt 82 (FIG. 8) extends through a hole 80c in wedge element 80 and into threaded engagement in a threaded socket of abutment 20j (FIG. 1). Compression coil spring 84 around bolt 82 retains the wedge snugly in its various adjusted positions. The head of bolt 82 is directly accessible through a suitable opening 83 (FIG. 1) in wall 20b as by an Allen wrench. Forcing wedge element 80 transversely inwardly toward throat 18 forces plunger 46 longitudinally forwardly against the rear of closed jaw 34 to shift jaw 34 further toward jaw 32.

Adjustment in the opposite direction is just as readily accomplished. Adjustment can moreover be achieved with the hitch coupled on a kingpin or uncoupled, a distinct advantage to achieve optimum fit and to avoid the prior necessity to unhitch and remove the trailer. The ready access to the adjustor also encourages the operator to do any necessary adjustment without the necessity to operate through the greasy hitch throat. If desired, initial adjustment can be performed at the factory and a plug placed in opening 83 to prevent later access.

The jaws 32 and 34, and the rear end of slide cam 50, are retained in position and supported by the underlying retention cover and support plate 90. Plate 90 is removably, i.e. releasably attached to the bottoms of walls 20a and 20b of the hitch by fasteners such as bolts 92 that thread into sockets 20k, by pivot pin bolt 76 and bolt 92', the latter two at the front end of plate 90. Thus the jaws are vertically secured between this underlying retention plate and the overlying hitch plate 12. Removal of the jaws is thus readily effected by removal of plate 90 and dropping the jaws, or if the hitch is inverted, lifting jaw 32 out of pocket 20m along with jaw 34. Replacement of worn jaws is accomplished merely by inserting another set and replacing plate 90. Wear is limited to the jaws as opposed to the hitch plate socket so that repair of the hitch is achieved by the single jaw replacement rather than welding and grinding of the fifth wheel forging socket. Or if it is desired to insert different jaws accommodating a different size kingpin, this substitution is just as readily achieved.

The jaws rest on cover plate 90. It is preferably made of high strength steel. Inadvertent lowering of a kingpin onto the jaws therefor, and particularly on the closing finger of the swinging jaw, does not result in damger to the jaws because the stress is transferred to the strong and securely fastened, underlying cover plate.

Although the operation of the apparatus is generally explained above and is apparent from the description of the apparatus, the sequence will be briefly repeated to assure complete clarity. Assuming that the jaws are positioned in the hitch assembly and all components being in place, and the jaws being in the open receptive condition depicted in FIG. 2, the relative movement between the hitch and a kingpin 30 at the correct corresponding elevation will cause the kingpin to enter mouth 16 and move into throat 18 until the enlarged lower head of kingpin 30 engages closing finger 34e of open jaw 34. (Although the kingpin is described for convenience as moving into the hitch, it will be realized that typically the hitch is moving toward the kingpin, but the relative movement is the same.) Jaw 34 thus is pivoted about pivot pin 32b toward jaw 32. When jaw 34 is partially closed as depicted in FIG. 3, its cam nose 34e engages nose 46c of extending plunger 46, such that further closure movement of jaw 34 causes plunger 46 to be momentarily further depressed against its coil compression spring 48. With this movement, cam follower 46a on plunger 46 moves transversely across configurated slot 50a in cam plate 50. Closure of jaw 34 also causes momentary compression of coil spring 38 of the overcenter biasing device for this jaw. As jaw 34 is moved completely closed, as in FIG. 4, the kingpin engages against the socket 32a of stationary jaw 32, and the enlarged head of the kingpin engages the protruding end of trigger 74, shifting it laterally against the bias of spring 78, so as to pivot the trigger about pin 76 and thereby shit its retention flange 74a away from in front of protruding flange 50d of slide cam 50. This releases flange 50d to move forwardly to its second position depicted in FIG. 1, along with releasing the rest of the slide cam to allow its compression spring 71 to shift it totally forwardly, longitudinally of the hitch, which results in the cam follower 46a of plunger 46 fitting snugly in end socket 50a' as in FIG. 4, preventing the locking plunger from being accidentally forceably moved from its extended lock position behind jaw 34. Simultaneously, the forward shift of cam plate 50 causes indicator rod 70 to protrude from the forward end of the hitch as in FIGS. 1 and 4, clearly indicating to an operator or observer that the hitch is fully locked.

When it is desired to release the hitch, the outer extending end of lever 60, or alternatively lever 62, is forcefully shifted forwardly of the hitch, causing rearward movement of pivot pin 64 connecting these levers, and also of pivot pin 60 connecting the levers to slide plate 50. This forces slide plate 50 rearwardly against the bias of spring 71, causing cam follower 46a of plunger 46 to be engaged by the sloped diagonal camming surface of configurated slot 50a of plate 50, and to ride therealong to depress plunger 46 transversely outwardly out from its locking position behind jaw 34, against the bias of spring 48. Further longitudinal shifting of cam plate 50 causes follower 46a to fit snugly into the recessed socket 50a' at the forward end of cam plate 50, to retain the plunger in its retracted position. Spring 48 retains it in this position, having greater biasing force than that of spring 71. In this condition of these levers and cam plate, such reset camming means serve as trigger reset means, with indicator rod 70 retracted within the fifth wheel, i.e. out of sight, while biasing spring 78 moves the trigger mechanism flange 74a again in front of flange 50d so as to restrain the cam plate in this rearward position. Relative movement of kingpin 30 then toward the rear of the hitch allows it to pivot jaw 34 open against the bias of its overcenter spring 38, the cam nose 34e of the jaw momentarily shifting plunger 46 slightly further so that cam follower 46a also shifts slightly and then falls back into its recess socket 50a". The hitch is then disengaged, and is also set for reengagement as necessary.

As explained in detail herebefore, if it is desired to connect the hitch to a different size kingpin, or to replace worn jaws, cover plate 90 is simply removed by removing the fasteners, the jaws are dropped out, or lifted out if the hitch is in inverted position, a new pair of jaws inserted, the plate replaced, and the unit is ready for operation. Also, as indicated previously, as the kingpin and/or jaws wear, adjustment can be readily made from the lateral outside of the hitch by inserting a simple Allen wrench or the equivalent through the opening in wall 20b (FIG. 1), to engage bolt 82, adjusting it and thereby wedge 80 transversely of the hitch to shift plunger 46 longitudinally of the hitch, i.e. transversely of the plunger, the desired amount, to force movable jaw 34 with appropriate pressure against the kingpin and indirectly stationary jaw 32. This can be done without reaching into the throat as with prior units, and can even be achieved while the hitch is coupled, for optimum adjustment.

It is conceivable that certain features of this novel hitch may be employed without other features, and/or may be modified in various ways to accommodate a particular arrangement for stanchion use on railroad flatbed cars and/or truck tractor use for highway purposes. One such variation is to have the diagonal cam surface of cam plate 50 oriented forwardly-outwardly instead of the rearwardly-outwardly orientation depicted. I.e. opening 50a would be the reverse of its shown orientation, with socket 50a' toward the rear and 50a" toward the front. Thus, plunger retraction would be in response to forward movement of the cam plate rather than rearward movement thereof. And indicator pin 70 would protrude from the forward end of the hitch when the hitch is connected rather than disconnected. The basic function of the apparatus would be the same. It is also conceivable that certain other structural variations may be made to accommodate the results achieved and described hereinbefore relative to the presently preferred embodiment depicted. Hence, the invention is intended to be limited not by the specific illustrative embodiment set forth, but only by the scope of the appended claims and the reasonable equivalents to the structures defined therein.

The embodiments of the present invention in which an exclusive property or privilege is claimed are defined as follows:

1. A fifth wheel hitch assembly having a bearing plate with a rearwardly opening mouth and throat to receive a depending kingpin having a reduced diameter hitch portion and an enlarged lower head; and a pair of jaws at said throat on the underside of said bearing plate to receive the kingpin, said jaws having arcuate surfaces to cooperatively receive the reduced diameter portion of the kingpin, one of said jaws being fixed and the other being shiftable between an open position and a closed position relative to said fixed jaw; and characterized by said shiftable jaw having a closure finger on the underside of said shiftable jaw, projecting generally horizontally into alignment with said throat, and radially and axially offset relative to said arcuate surfaces of said shiftable jaw to be engaged by the enlarged lower head of an entering kingpin for shifting closure of said shiftable jaw, said underside location of said finger causing a kingpin at an elevated position to miss said finger and thereby fail to shift said finger and said shiftable jaw to said closed position;

said shiftable jaw being pivotally mounted to shift between said open and closed positions;

a locking plunger shiftable between an unlock position and a lock position, in the latter of which said locking plunger lies in the path of said shiftable jaw in said closed position, to prevent said shiftable jaw from shifting to said open position;

means for biasing said locking plunger toward said lock position, and trigger release means operatively associated with said locking plunger and positioned adjacent said throat to be actuable by an entering kingpin for releasing said locking plunger into its lock position; and said trigger release means being vertically positioned to be engaged by the enlaged lower head of the entering kingpin.

2. A fifth wheel hitch assembly having a bearing plate with a rearwardly opening mouth and throat to receive a depending kingpin having a reduced diameter hitch portion and an enlarged lower head; and a pair of jaws at said throat on the underside of said bearing plate to receive the kingpin, said jaws having arcuate surfaces to cooperatively receive the reduced diameter portion of the kingpin, one of said jaws being fixed and the other being shiftable between an open position and a closed position relative to said fixed jaw; and characterized by said shiftable jaw having a closure finger on the underside of said shiftable jaw, projecting generally horizontally into alignment with said throat, and radially and axially offset relative to said arcuate surfaces of said shiftable jaw to be engaged by the enlarged lower head of an entering kingpin for shifting closure of said shiftable jaw, said underside location of said finger causing a kingpin at an elevated position to miss said finger and thereby fail to shift said finger and said shiftable jaw to said closed position;

said shiftable jaw being pivotally mounted to shift between said open and closed positions;

a locking plunger shiftable between an unlock position and a lock position, in the latter of which said locking plunger lies in the path of said shiftable jaw in said closed position, to prevent said shiftable jaw from shifting to said open position;

means for biasing said locking plunger toward said lock position, trigger release means operatively associated with said locking plunger and positioned adjacent said throat to be actuable by an entering kingpin for releasing said locking plunger into its lock position;

reset camming means for shifting said locking plunger to said unlock position;

said reset camming means also including trigger reset means for resetting said trigger release means with shifting of said locking plunger to said unlock position; and said reset camming means comprising a slide having a camming surface for shifting said locking plunger, and actuator means extending laterally from said hitch for resetting thereof.

3. The hitch in claim 2 characterized by said actuator means extending laterally from both sides of said hitch to allow resetting from either side.

4. A fifth wheel hitch assembly having a bearing plate with opposite lateral portions and with a rearwardly opening mouth and throat to receive a kingpin having a reduced diameter hitch portion and an enlarged lower head; and a pair of jaws at said throat on the underside of said bearing plate, to receive a kingpin, said jaws having arcuate surfaces to cooperatively receive the reduced diameter portion of the kingpin, one of said jaws being fixed and the other being shiftable between an open position and a closed position relative to said fixed jaw; said shiftable jaw being mounted to shift from an open position to a closed position by a kingpin entering said throat, a locking plunger shiftable between an unlock position and a lock position, in the latter of which said locking plunger lies in the path of said shiftable jaw when closed, to prevent said shiftable jaw from shifting to said open position, and characterized by a fore-to-aft cam slide having reset camming means for shifting said locking plunger to said unlock position; said cam slide comprising a plate having a camming slot and pin connection to said locking plunger for said camming means; and actuator means for shifting said cam slide to move said locking plunger to said unlock position.

5. A fifth wheel hitch assembly having a bearing plate with opposite lateral portions and with a rearwardly opening mouth and throat to receive a kingpin having a reduced diameter hitch portion and an enlarged lower head; and a pair of jaws at said throat on the underside of said bearing plate, to receive a kingpin, said jaws having arcuate surfaces to cooperatively receive the reduced diameter portion of the kingpin, one of said jaws being fixed and the other being shiftable between an open position and a closed position relative to said fixed jaw; characterized by said shiftable jaw being mounted to shift from an open position to a closed position by a kingpin entering said throat, a locking plunger shiftable between an unlock position and a lock position, in the latter of which said locking plunger lies in the path of said shiftable jaw when closed, to prevent said shiftable jaw from shifting to said open position, and including a cam slide having reset camming means for shifting said locking plunger to said unlock position; said locking plunger being biased towrad said lock position, and trigger release means operatively associated with said locking plunger and positioned adjacent said throat to be actuable by an entering kingpin for releasing said locking plunger into its lock position; said cam slide also including trigger reset means for resetting said trigger release means with shifting of said locking plunger to said unlock position, and including actuator means for shifting said cam slide to thereby shift said locking plunger to its unlock position and resetting said trigger release means.

6. The hitch in claim 5 characterized by said actuator means having actuating levers extending laterally from both sides of said hitch for actuation thereof from either side of said hitch.

7. A fifth wheel hitch assembly having a bearing plate with opposite lateral portions and with a rearwardly opening mouth and throat to receive a kingpin having a reduced diameter hitch portion and an enlarged lower head; and a pair of jaws at said throat on the underside of said bearing plate, to receive a kingpin, said jaws having arcuate surfaces to cooperatively receive the reduced diameter portion of the kingpin, one of said jaws being fixed and the other being shiftable between an open position and a closed position relative to said fixed jaw; characterized by said shiftable jaw being mounted to shift from an open position to a closed position by a kingpin entering said throat, a locking plunger shiftable between an unlock position and a lock position, in the latter of which said locking plunger lies in the path of said shiftable jaw when closed, to prevent said shiftable jaw from shifting to said open position, adjustment means for said locking plunger accessible from one of said opposite lateral portions and engaging said plunger, said adjustment means being controllably movable and capable of longitudinally adjusting the position of said plunger, toward or away from said shiftable jaw when in said closed position, to accommodate wear of a kingpin and/or of said jaws.

8. The hitch in claim 7 characterized by said adjustment means comprising a wedge element movable transversely of said hitch to effect the longitudinal plunger adjustment.

9. The hitch in claim 8 characterized by including a threaded member which is what is accessible from said one of said lateral hitch portions, and which engages said wedge element for adjustable movement thereof.

* * * * *

UNITED STATES PATENT AND TRADEMARK OFFICE
CERTIFICATE OF CORRECTION

PATENT NO. : 4,566,715

DATED : January 28, 1986

INVENTOR(S) : John T. Buckley

It is certified that error appears in the above-identified patent and that said Letters Patent is hereby corrected as shown below:

Column 2, line 1:
"would" should be --could--

Column 2, line 44:
"removably" should be --removable--

Column 2, line 64:
"use" should be --usage--

Column 3, line 66:
"and" should be --on--

Column 4, line 32:
"forward" should be --forwardly--

Column 5, line 59:
"air" should be --pair--

Column 7, line 9:
"clocked" should be --cocked--

Column 8, line 45:
"damger" should be --damage--

Column 9, line 10:
"shit" should be --shift--

Column 11, line 64, claim 4:
"can" should be --cam--

UNITED STATES PATENT AND TRADEMARK OFFICE
CERTIFICATE OF CORRECTION

PATENT NO. : 4,566,715

DATED : January 28, 1986

INVENTOR(S) : John T. Buckley

It is certified that error appears in the above-identified patent and that said Letters Patent is hereby corrected as shown below:

Column 12, line 22, claim 5:
"towrad" should be --toward--

Signed and Sealed this

Fifth Day of August 1986

[SEAL]

Attest:

DONALD J. QUIGG

Attesting Officer

Commissioner of Patents and Trademarks